United States Patent [19]

Sougawa et al.

[11] Patent Number: 4,913,108
[45] Date of Patent: Apr. 3, 1990

[54] SEPARATE LUBRICATING SYSTEM OF ENGINES

[75] Inventors: Masafumi Sougawa; Isao Kanno, both of Hamamatsu, Japan

[73] Assignee: Sanshin Kogyo Kabushiki Kaisha, Hamamatsu, Japan

[21] Appl. No.: 254,417

[22] Filed: Oct. 6, 1988

[30] Foreign Application Priority Data

Oct. 8, 1987 [JP] Japan .................................. 62-252347

[51] Int. Cl.$^4$ .............................................. F01M 1/00
[52] U.S. Cl. .............................. 123/196 S; 184/103.1; 123/198 D
[58] Field of Search ........................ 123/196.5, 198 D; 184/103.1, 108

[56] References Cited

U.S. PATENT DOCUMENTS

| | | | |
|---|---|---|---|
| 3,934,678 | 1/1976 | Jennings | 184/103.1 |
| 4,012,012 | 3/1977 | Ligler | 123/196 S |
| 4,105,092 | 8/1978 | Zeidler et al. | 184/103.1 |
| 4,462,352 | 7/1984 | Mills | 123/196 S |
| 4,489,311 | 12/1984 | Lang et al. | 123/196 S |
| 4,562,801 | 1/1986 | Koike | 123/196 S |
| 4,563,988 | 1/1986 | Weishaupt | 184/103.1 |
| 4,572,120 | 2/1986 | Matsumoto | 123/196 S |
| 4,768,471 | 9/1988 | Draxler | 123/196 S |

Primary Examiner—E. Rollins Cross
Attorney, Agent, or Firm—Ernest A. Beutler

[57] ABSTRACT

A separate lubricating system for an engine including a lubricant reservoir and a system for delivering lubricant from the reservoir to the engine for its lubrication. A sensing device is provided in the lubricant system for sensing the lubricant flow and comparing it with a desired flow for providing a warning signal in the event of inadequate lubricant flow. The invention is illustrated in a specific embodiment as applied to an outboard motor.

28 Claims, 4 Drawing Sheets

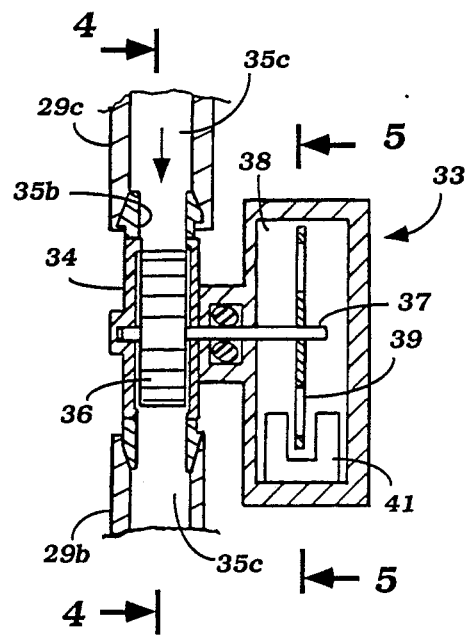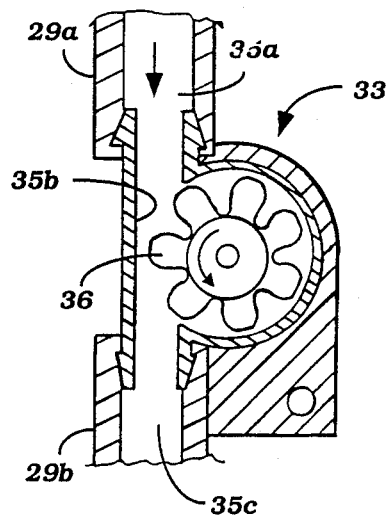
Figure 3  Figure 4
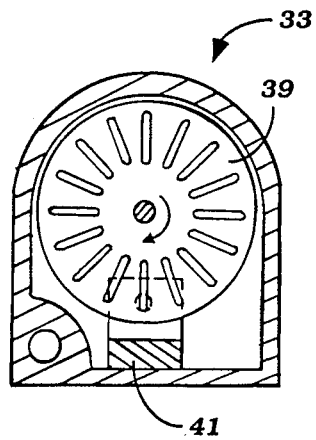
Figure 5

SEPARATE LUBRICATING SYSTEM OF ENGINES

BACKGROUND OF THE INVENTION

This invention relates to a separate lubricating system for an engine and more particularly to an arrangement for providing a safety warning in the event of failure of an engine lubricating system to provide sufficient lubricant to the engine.

As is well known, a variety of engines are provided with lubricating systems for providing lubricant to various of their moving components. In connection with two-cycle internal combustion engines, it has been a general practice to mix lubricant with the fuel and the engine is thus lubricated. However, such arrangements may not be fully satisfactory under all conditions.

It has, therefore, been proposed to provide two-cycle engines with separate lubricating systems wherein a separate lubricant reservoir is provided and lubricant is delivered to the engine for its lubrication by a lubricant system that delivers lubricant from the reservoir to the engine. In a typical application, a lubricant pump is employed for this purpose.

This type of arrangement is very popular in conjunction with outboard motors wherein a large lubricant reservoir may be positioned in the hull of a watercraft and a smaller lubricant delivery tank contained within the power head of the powering outboard motor. Lubricant is transferred from the lubricant reservoir to the lubricant delivery tank and then transferred from this delivery tank to the engine for its lubrication.

In connection with such systems, it is, of course, desirable that the engine be protected from circumstances under which inadequate lubricant is supplied to the engine. Therefore, a wide variety of protective devices have been incorporated which sense both the level of lubricant in the storage tank and in the supply tank. Of course, these arrangements do not sense whether or not lubricant is actually being delivered to the engine. Various backup or additional safety systems have been employed that provide an indication of warning in the event of such malfunctions as failure of the oil pump drive shaft to be rotated, clogging of the oil filter or the like. However, none of these systems are actually responsive to nor sense the actual flow of lubricant to the engine and, hence, they cannot anticipate all types of failures, even those which may only remotely occur.

It is, therefore, a principal object of this invention to provide an improved warning arrangement for a separately lubricated internal combustion engine.

It is a further object of this invention to provide an improved engine protection system for protecting the engine in the event that the flow of lubricant to it is less than the required quantity.

SUMMARY OF THE INVENTION

This invention is adapted to be embodied in a lubricating system for an internal combustion engine that has a lubricant reservoir and a lubricant system for delivering lubricant from the reservoir to the engine for its lubrication. In accordance with the invention, means measure the amount of lubricant flowing through the lubricant system and provide a signal in the event the amount of lubricant flow is less than a predetermined amount.

BRIEF DESCRIPTION OF THE DRAWINGS

FIG. 3 is a further enlarged cross-sectional view showing the arrangement for measuring the flow of lubricant.

FIG. 4 is a cross-sectional view taken along the line 4—4 of FIG. 3.

FIG. 5 is a cross-sectional view taken along the line 5—5 of FIG. 3.

DETAILED DESCRIPTION OF THE PREFERRED EMBODIMENT

Figure 1:
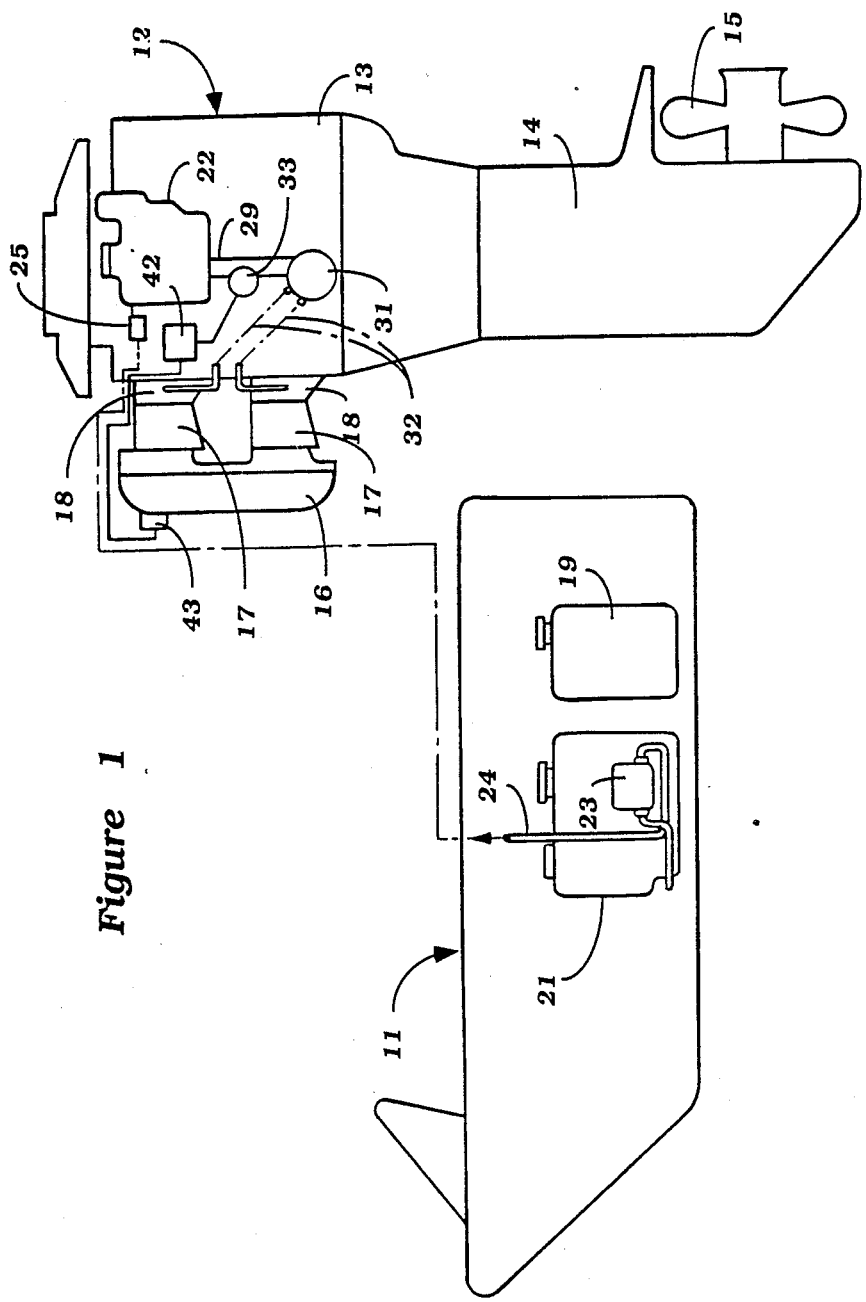
FIG. 1 is a side elevational view, in partially schematic form, of a watercraft powered by an engine embodying a lubricant system in accordance with an embodiment of the invention.

Referring first in detail to the drawings and primarily to FIG. 1, a watercraft is identified generally by the reference numeral 11 and is powered by a marine propulsion device 12 in the form of an outboard motor. As is well known, the outboard motor 12, which is shown in enlarged view in this figure, is attached to the transom of the watercraft 11 and is supported for both steering and tilt and trim movement. Since these structures form no part of the invention, they have not been illustrated and further description is believed to be unnecessary.

The outboard motor 12 includes a power head that is comprised of an internal combustion engine 13, which may be of any known type but which is depicted as being of the two-cycle, crankcase compression type embodying two inline cylinders. It is to be understood, however, that the invention may be utilized in conjunction with other types of engines having other configurations and operating on other than the two stroke principle. In addition, the invention can be utilized in conjunction with engines other than those associated with an outboard motor. However, the invention has particular utility in such applications.

The engine 13 drives a drive shaft (not shown) which extends through a drive shaft housing and lower unit 14 for operating a propeller 15 in a known manner. As is normal practice, the engine 13 will be concealed within a protective cowling which has been deleted in the drawings so as to more clearly show the construction.

The engine 13 is provided with an induction system including an air inlet device 16 which draws induction air through the interior of the protective cowling and which silences it. The air inlet device 16, in turn, delivers this air to carburetors 17 that form a fuel/air mixture which is discharged to the crankcase chambers of the engine 13 through intake manifolds 18 in which may be provided check valves for preventing reverse flow. Fuel is supplied to the carburetors 17 from a fuel reservoir 19 that is supported within the watercraft 11 through a suitable conduit (not shown) which may include a priming pump and a quick disconnect coupling. Since this construction forms no part of the invention, it has not been illustrated nor is a description of it believed to be necessary.

The engine 13 is also provided with a separate lubricating system so that lubricant need not h=mixed with the fuel in the tank 19. This separate lubricating system includes a lubricant reservoir 21 which can have a large capacity and which is contained within the hull of the watercraft 11. Lubricant is pumped from the lubricant reservoir 21 to a lubricant delivery tank 22 that is mounted on the side of the engine 13 or within the power head of the outboard motor 12 by means of an electrically operated lubricant pump 23 and conduit 24. If desired, a filter 25 may be positioned in the conduit 24 adjacent the lubricant delivery tank 22 or at any other place in the lubricant system.

A liquid level gauge 26 is contained within the lubricant reservoir 21 and provides a signal indicative of the level of lubricant therein. In addition, a liquid level gauge 27 may be contained within the lubricant delivery tank 22 in a stand pipe 28 that provides the discharge from the lubricant delivery tank 22. The lubricant level gauge 27 operates so as to switch the pump 23 on when the amount of lubricant in the lubricant delivery tank 22 falls below a predetermined level. In addition, the level gauges 26 and 27 may be interconnected with a warning system of the type described in U.S. Pat. No. 4,572,120, issued Feb. 25, 1986, entitled "Separate Lubricating System For Marine Propulsion Device", assigned to the assignee of this application.

From the lubricant delivery tank 22 and specifically its standpipe 28, lubricant is delivered through a conduit 29 to a lubricant delivery pump 31. The lubricant delivery pump 31 is driven in a suitable manner from the engine and supplies lubricant through a plurality of discharge conduits 32 to components of the engine to be lubricated. The delivery conduits 32 may supply lubricant either to the intake manifolds 18 for delivery to the engine along with the fuel/air mixture. Alternatively, the delivery conduits 32 may also extend to specific components of the engine to be lubricated.

In accordance with the invention, in addition to any warning or protective system provided by the level indicators 26 and 27, the system is provided with a warning arrangement for indicating a dangerous condition in the event the amount of lubricant delivered by the lubricant pump 31 is insufficient for adequate lubrication. For this purpose, a lubricant flow meter, indicated generally by the reference numerals 33 and shown in most detail in FIGS. 3 through 5, is provided in the conduit 29 interconnecting the delivery tank 22 to the lubricant pump 31. By putting the flow sensor 33 in this conduit, only a single sensor is required rather than plural sensors, as would be necessary if they were placed in the individual delivery conduits 32.

Referring now in detail to FIGS. 3 through 5, the construction of the flow sensing device 33 will be described. The flow sensing device 33 includes a conduit section 34 that is interposed between a pair of sections 29a and 29b of the conduit 29 so as to provide a through flow path consisting of passages 35a, 35b and 35c. Positioned within the flow passage 35b of the section 34 is a paddle wheel or impeller 36 that is supported upon a shaft 37. The impeller 36 will rotate along with the shaft 37 at a rate that is related to the mass flow through the conduit 29 and that delivered by the lubricant pump 31.

The flow sensing device defines a further cavity 38 in which a serrated disk 39 is fixed to the shaft 37 for rotation with the shaft 37 and impeller 36. A suitable sensing device 41, which may a photoelectric device, is disposed so as to sense the interruptions in the serrated wheel 39 so as to provide a pulse signal that is indicative of the rate of rotation of the shaft 37 and, accordingly, the amount of lubricant delivered by the pump 31 and flowing through the conduit 39.

Figure 2:
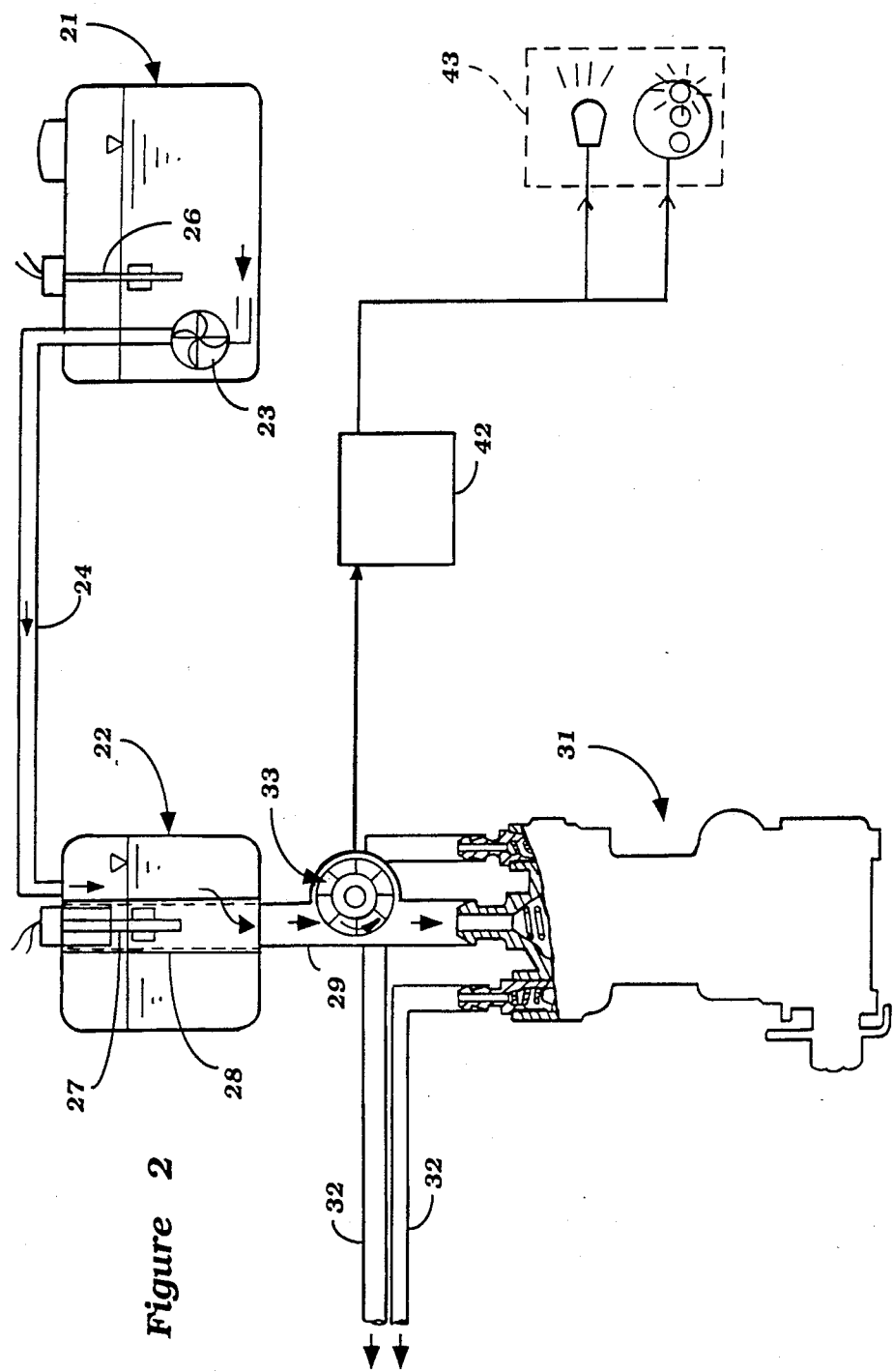
FIG. 2 is an enlarged, partially schematic, partially cross-sectional view showing the lubricant system.
Figure 6:
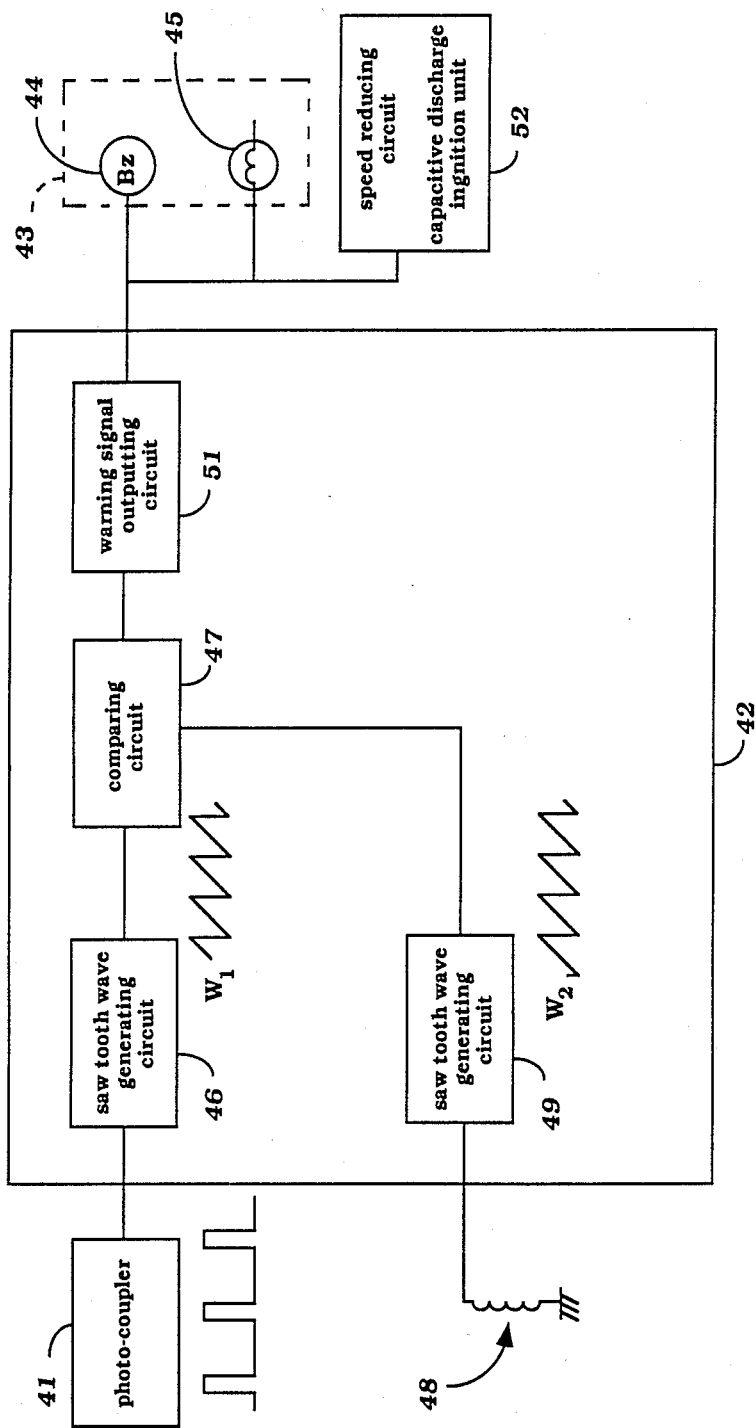
FIG. 6 is a schematic block diagram showing the control logic and system for this embodiment.

These pulse signals are transmitted to a control unit 42 (FIG. 2), the construction of which may be best understood by reference to the schematic block diagram of FIG. 6. In essence, the control device 42 senses the amount of lubricant flowing, as determined by the sensing device 33, compares it with the desired lubricant flow for a given engine speed and outputs a warning signal to a warning device, indicated schematically at 43 in the event the amount of lubricant flowing in adequate. It should be noted that the warning device 43 is mounted on the outer protective cowling of the outboard motor at a forwardmost location so that the operator may readily discern that the warning condition is present. The warning indicator 43 may comprise a buzzer 44 and warning light 45 or either or both of such warning devices.

Referring now specifically to FIG. 6, the photodetector 41 outputs a square wave signal to a sawtooth wave generating circuit 46 of the control device 42. This has an output waveform $W_1$ which is fed as one input to a comparing circuit 47. In addition, a speed signal is also transmitted to the comparing circuit 47. This speed signal may be conveniently generated by a pulser coil 48 of the ignition circuit which also outputs a square wave signal to the control device 42. This square wave signal is transmitted to a sawtooth wave generating circuit 49 which outputs a waveform $W_2$ to the comparing circuit 47. The comparing circuit 47 is designed so as to compare these signals $W_1$ and $W_2$ and determine if the amount of lubricant flowing, as sensed by the detector 41, is adequate for the speed of the engine, as sensed by the pulser coil 48. If the amount of lubricant flowing is inadequate, a warning signal is outputted to a warning signal output circuit 51 which, in turn, serves to activate the warning device 43 by sounding the buzzer 44 and/or illuminating the light 45. In addition, there may be incorporated a speed reducing circuit 52 that operates on the engine ignition system so as to reduce the speed of the engine and prevent damage as might occur due to the lack of adequate lubrication. Any of the known type speed reducing circuits may be employed for this purpose. For example, such circuits may cooperate with the capacitor discharge ignition system of the engine so as to cause periodic interrupting or misfiring of the spark plugs.

It should be readily apparent from the foregoing description that the described embodiment of the invention is particularly effective in insuring the adequate flow of lubricant to the engine by measuring the actual amount of lubricant flowing. This is done by a single sensing device and thus the multiplicity of sensors required if the output of the pump were measured rather than the flow to the lubricating pump can be significantly reduced. Also, it is to be understood that the foregoing description is that of a preferred embodiment of the invention and that various changes and modifications may be made without departing from the spirit and scope of the invention, as defined by the appended claims.

We claim:

1. A non-return lubricating system for a two-cycle internal combustion engine, a lubricant system for delivering lubricant from said reservoir to said engine for its lubrication and consumption therein without return to said lubricant reservoir, means for measuring the amount of lubricant flowing through said system, and means for providing a signal in the event the amount of lubricant flow measured is less than a predetermined amount.

2. In a lubricating system as set forth in claim 1 wherein the lubricant system includes a pump for delivering lubricant to the engine.

3. In a lubricating system as set forth in claim 2 wherein the pump has multiple outlets for delivering lubricants to different portions of the engine.

4. In a lubricating system as set forth in claim 3 wherein the means for sensing the amount of lubricant flowing through the system senses the amount of lubricant flow from the lubricant reservoir to the pump.

5. In a lubricating system as set forth in claim 4 wherein the means for measuring the amount of lubricant flow comprises an impeller.

6. In a lubricating system as set forth in claim 5 wherein the impeller drives a photoelectric sensing device.

7. In a lubricating system as set forth in claim 1 further including means for measuring the speed of the engine and the means for providing a signal compares the amount of lubricant flowing as measured by the means for measuring with the speed of the engine.

8. In a lubricating system as set forth in claim 7 wherein the lubricant system includes a pump for delivering lubricant to the engine.

9. In a lubricating system as set forth in claim 8 wherein the pump has multiple outlets for delivering lubricants to different portions of the engine.

10. In a lubricating system as set forth in claim 9 wherein the means for sensing the amount of lubricant flowing through the system senses the amount of lubricant flow from the lubricant reservoir to the pump.

11. In a lubricating system as set forth in claim 10 wherein the means for measuring the amount of lubricant flow comprises an impeller.

12. In a lubricating system as set forth in claim 1 wherein the lubricant system includes a lubricant storage tank and means for delivering lubricant from the lubricant storage tank to the lubricant reservoir.

13. In a lubricating system as set forth in claim 12 in combination with an outboard motor wherein the lubricant reservoir and the lubricant system are contained within the outboard motor and the lubricant storage tank is a separate tank adapted to be positioned in the hull of an associated watercraft.

14. In a lubricating system as set forth in claim 13 wherein the lubricant system includes a pump for delivering lubricant to the engine.

15. In a lubricating system as set forth in claim 14 wherein the pump has multiple outlets for delivering lubricants to different portions of the engine.

16. In a lubricating system as set forth in claim 15 wherein the means for sensing the amount of lubricant flowing through the system senses the amount of lubricant flow from the lubricant reservoir to the pump.

17. In a lubricating system for an internal combustion engine having a lubricant reservoir, a lubricant system for delivering lubricant from said reservoir to said engine for its lubrication, a pump for delivering lubricant to the engine, said means for measuring the amount of lubricant flowing through said system, said means for sensing the amount of lubricant flowing through the system comprising an impeller sensing the amount of lubricant flow from said lubricant reservoir to said pump, and means for providing a signal in the event the amount of lubricant flow measured is less than a predetermined amount.

18. In a lubricating system as set forth in claim 17 wherein the impeller drives a photoelectric sensing device.

19. In a lubricating system for an internal combustion engine having a lubricant reservoir, a lubricant system for delivering lubricant from said reservoir to said engine for its lubrication, means for measuring the amount of lubricant flowing through said system, means for measuring the speed of said engine, and means for providing a signal in the event the amount of lubricant flow measured is less than a predetermined amount required for lubrication at the measured speed.

20. In a lubricating system as set forth in claim 19 wherein the lubricant system includes a pump for delivering lubricant to the engine.

21. In a lubricating system as set forth in claim 20 wherein the pump has multiple outlets for delivering lubricants to different portions.

22. In a lubricating system as set forth in claim 21 wherein the means for sensing the amount of lubricant flowing through the system senses the amount of lubricant flow from the lubricant reservoir to the pump.

23. In a lubricating system as set forth in claim 22 wherein the means for measuring the amount of lubricant flow comprises an impeller.

24. In a lubricating system as set forth in claim 19 wherein the lubricant system includes a lubricant storage tank and means for delivering the lubricant from the lubricant storage tank to the lubricant reservoir.

25. In a lubricating system as set forth in claim 24 in combination with an outboard motor wherein the lubricant reservoir and the lubricant system are contained within the outboard motor and the lubricant storage tank is a separate tank adapted to be positioned in the hull of an associated watercraft.

26. In a lubricating system as set forth in claim 25 wherein the lubricant system includes a pump for delivering lubricant to the engine.

27. In a lubricating system as set forth in claim 26 wherein the pump has multiple outlets for delivering lubricants to different portions of the engine.

28. In a lubricating system as set forth in claim 27 wherein the means for sensing the amount of lubricant flow from the lubricant reservoir to the pump.

* * * * *